US008052951B2

(12) United States Patent
Menchhofer et al.

(10) Patent No.: US 8,052,951 B2
(45) Date of Patent: Nov. 8, 2011

(54) CARBON NANOTUBES GROWN ON BULK MATERIALS AND METHODS FOR FABRICATION

(75) Inventors: Paul A. Menchhofer, Clinton, TN (US); Frederick C. Montgomery, Oak Ridge, TN (US); Frederick S. Baker, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 202 days.

(21) Appl. No.: 12/417,887

(22) Filed: Apr. 3, 2009

(65) Prior Publication Data

US 2010/0254885 A1 Oct. 7, 2010

(51) Int. Cl.
*D01F 9/12* (2006.01)
(52) U.S. Cl. ............... 423/447.2; 423/447.1; 423/447.3; 977/742; 977/842
(58) Field of Classification Search ............... 423/447.1, 423/447.3, 445 B; 977/742, 842
See application file for complete search history.

(56) References Cited

U.S. PATENT DOCUMENTS

2009/0208708 A1* 8/2009 Wei et al. ..................... 428/174

FOREIGN PATENT DOCUMENTS

| CN | 200610114426 | * 11/2006 |
| EP | 1712522 A1 | * 10/2006 |
| WO | WO 2008048313 A2 | * 4/2008 |

OTHER PUBLICATIONS

Colin Park, Mark A Keane, Catalyst support effects in the growth of structured carbon from the decomposition of ethylene over nickel, Journal of Catalysis, vol. 221, Issue 2, Jan. 25, 2004, pp. 386-399, ISSN 0021-9517, DOI: 10.1016/j.jcat.2003.08.014. (http://www.sciencedirect.com/science/article/B6WHJ-49VC63P-B/2/7736f1bcd359fb33e7663f2ed7cd.*
O. Smiljanic, T. Dellero, A. Serventi, G. Lebrun, B. L. Stansfield, J. P. Dodelet, M. Trudeau, S. Desilets, Growth of carbon nanotubes on Ohmically heated carbon paper, Chemical Physics Letters, vol. 342, Issues 5-6, Jul. 20, 2001, pp. 503-509, ISSN 0009-2614, DOI: 10.1016/S0009-2614(01)00650-9.*

* cited by examiner

*Primary Examiner* — Stuart Hendrickson
*Assistant Examiner* — Richard M Rump
(74) *Attorney, Agent, or Firm* — Luedeka, Neely & Graham, P.C.

(57) ABSTRACT

Disclosed are structures formed as bulk support media having carbon nanotubes formed therewith. The bulk support media may comprise fibers or particles and the fibers or particles may be formed from such materials as quartz, carbon, or activated carbon. Metal catalyst species are formed adjacent the surfaces of the bulk support material, and carbon nanotubes are grown adjacent the surfaces of the metal catalyst species. Methods employ metal salt solutions that may comprise iron salts such as iron chloride, aluminum salts such as aluminum chloride, or nickel salts such as nickel chloride. Carbon nanotubes may be separated from the carbon-based bulk support media and the metal catalyst species by using concentrated acids to oxidize the carbon-based bulk support media and the metal catalyst species.

23 Claims, 5 Drawing Sheets

CARBON NANOTUBES GROWN ON BULK MATERIALS AND METHODS FOR FABRICATION

GOVERNMENT RIGHTS

This invention was made with government support under Contract No. DE-AC05-00OR22725 awarded by the U.S. Department of Energy. The government has certain rights in the invention.

FIELD

This disclosure relates to the field of nanostructures. More particularly, this disclosure relates to carbon nanotubes grown on bulk materials such as fibers and particles.

BACKGROUND

Nanostructured materials have many structural, electronic, and physical chemistry applications. Nanostructured materials are generally defined as materials that have at least one dimension less than 100 nm, and more typically a dimension that is less than 50 nm. Some authorities restrict the definition of nanostructures to materials having a least one dimension that is less than 30 nm. The smallest size that is used in reference to nanostructures is generally recognized to be approximately 0.2 nm. Materials having a dimension smaller than 0.2 nm are generally considered to be atomic/molecular-scale materials, not nanostructures. Of particular interest is the form of nanostructures called carbon nanotubes. Carbon nanotubes are tubular in shape where the wall of the tube is typically formed as a matrix of carbon atoms arranged in a replicated hexagonal pattern. Carbon nanotubes may be singled-walled or multi-walled. Single-walled carbon nanotubes have walls that are only one carbon atom thick. The diameter of single-walled carbon nanotube is typically about 1 nm. Multi-walled carbon nanotubes have walls formed as a plurality of layers of hexagonally-arranged carbon atoms. Multi-walled carbon nanotubes typically have a diameter that is on the order of a few nanometers. The ends of carbon nanotubes may be capped with a hemispherical pattern of carbon atoms like a buckminsterfullerene ("bucky—ball"). Carbon nanotubes may have lengths that are in the micron range, or even longer, which provides a material of extraordinarily large aspect ratio (ratio of length to diameter) compared with other basic material building blocks. Carbon nanotubes also have extremely high specific tensile strengths and extremely high specific elastic modulus values. Carbon nanotubes also have an electro-chemical affinity for certain atomic and molecular species. Because of these properties, carbon nanotubes have important prospective applications in such fields as high-performance mechanical materials, electronics, and chemical processing. However, despite over a decade of research, problems still exist with production methods for carbon nanotubes. As a consequence high quality carbon nanotubes are expensive. Furthermore, because carbon nanotubes are tiny by most standards, it is difficult to handle them and position them in desired application configurations. What are needed therefore are better methods of fabricating desirable configurations of carbon nanotubes that are less expensive and easier to adapt for consumer and industrial applications.

SUMMARY

In one embodiment the present disclosure provides a bulk nanotube structure that includes a bulk support media having bulk support media surfaces. There are a plurality of metal catalyst species disposed adjacent the bulk support media surfaces, where the metal catalyst species have metal catalyst species surfaces, and there are a plurality of carbon nanotubes that are disposed adjacent the catalytic surfaces of the metal catalyst species surfaces.

A method of fabricating a bulk nanotube structure is provided. The method includes a step of wetting a bulk support media with a metal salt solution, and then drying the wetted bulk support media to form metal salts adjacent the bulk support media. A further step is heating the bulk support media and the metal salts in a reducing atmosphere having a pressure in a range from about 5 Torr to about atmospheric pressure to a temperature in a range from about 500° C. to about 700° C. to form metal catalyst species adjacent the bulk support media. A further step is exposing the heated bulk support media and the metal catalyst species to a gaseous mixture comprising an organic vapor and hydrogen, such that carbon nanotubes are formed adjacent the metal catalyst species.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
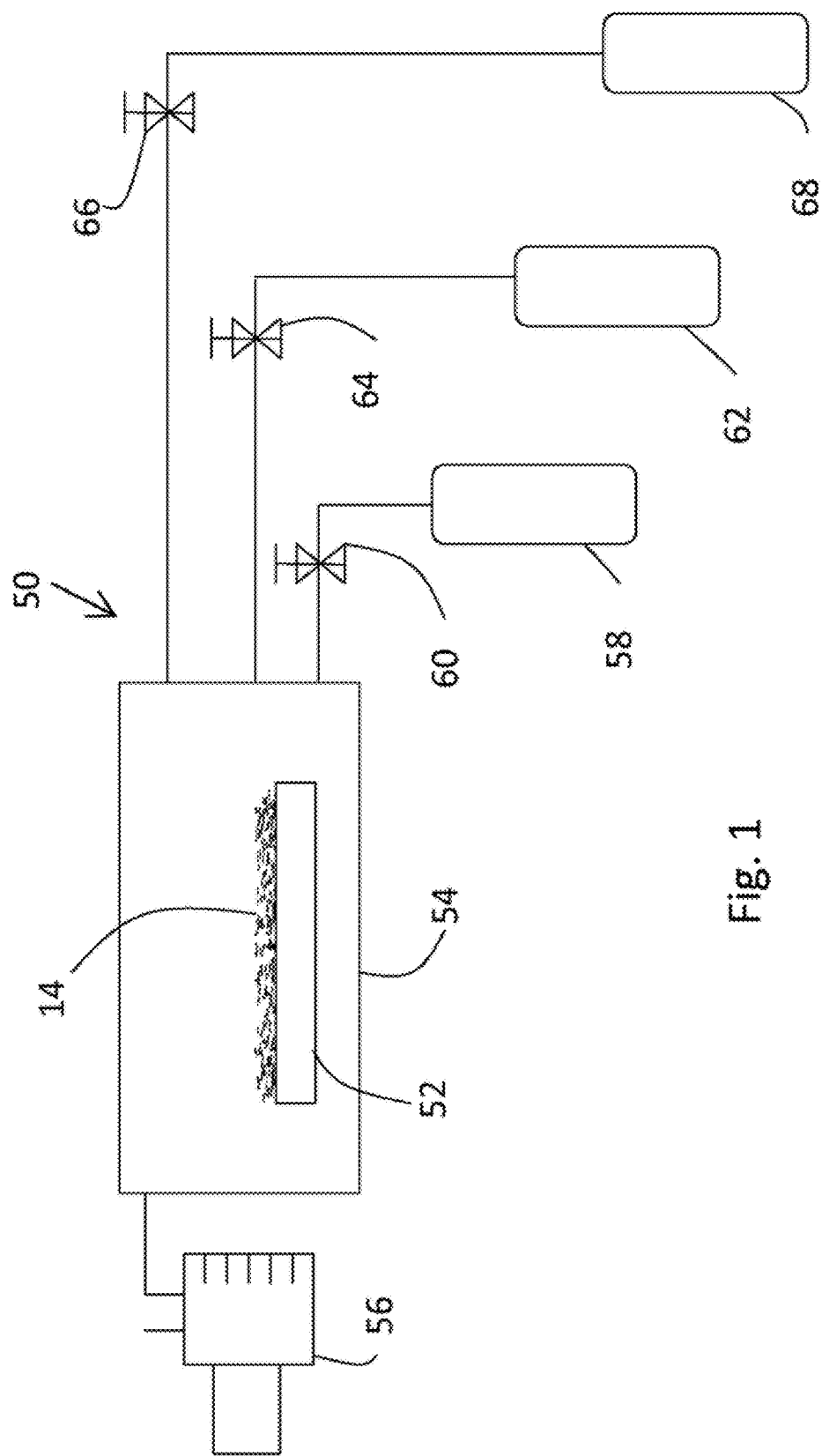
FIG. 1 is a somewhat schematic view of an apparatus to manufacture bulk nanotube structures.
Figure 2:
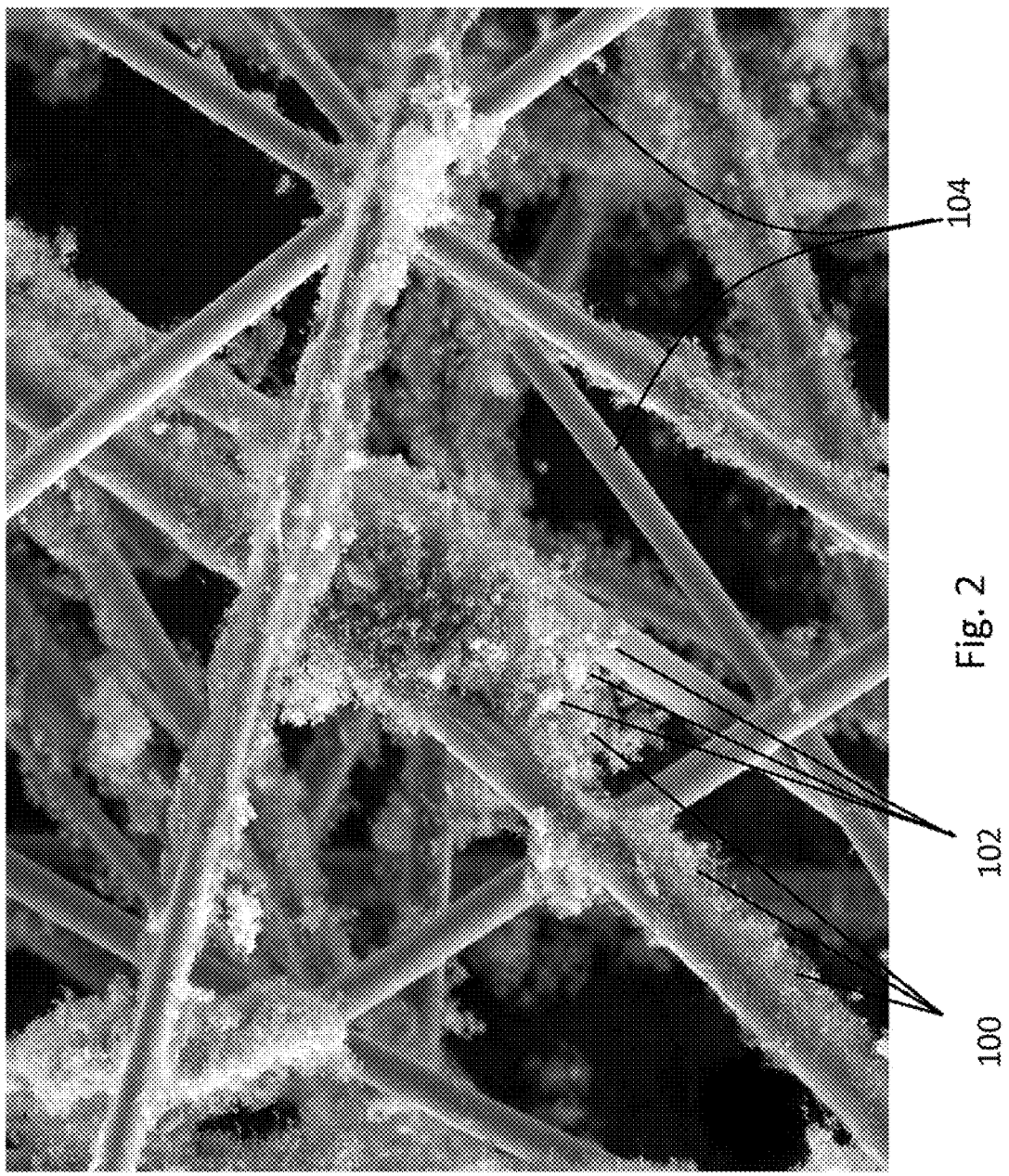
FIGS. 2-5 are photomicrographs of fibers with metal catalyst species disposed adjacent the surfaces of the fibers and carbon nanotubes disposed adjacent the surfaces of the metal catalyst species.
Figure 3:
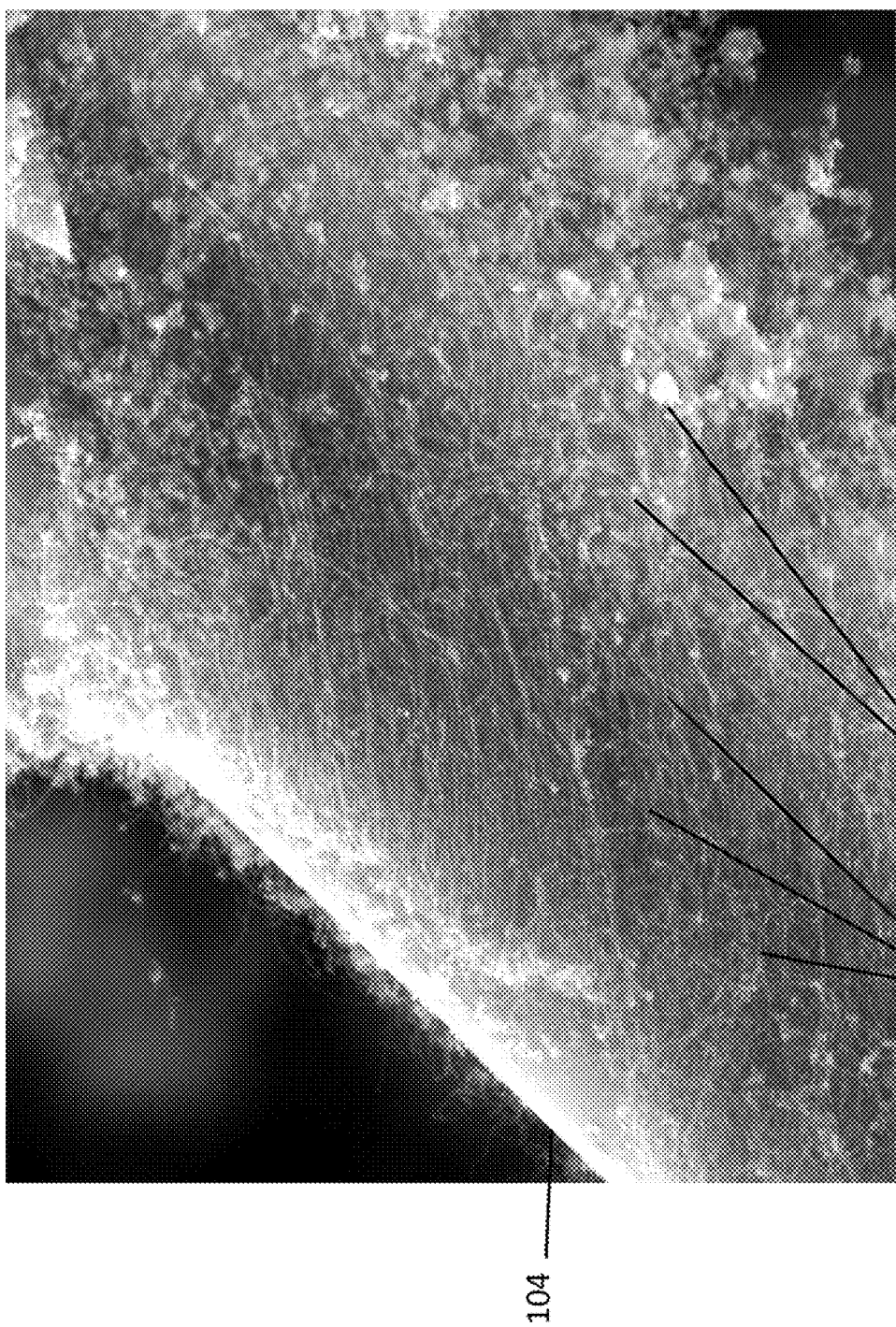
Figure 4:
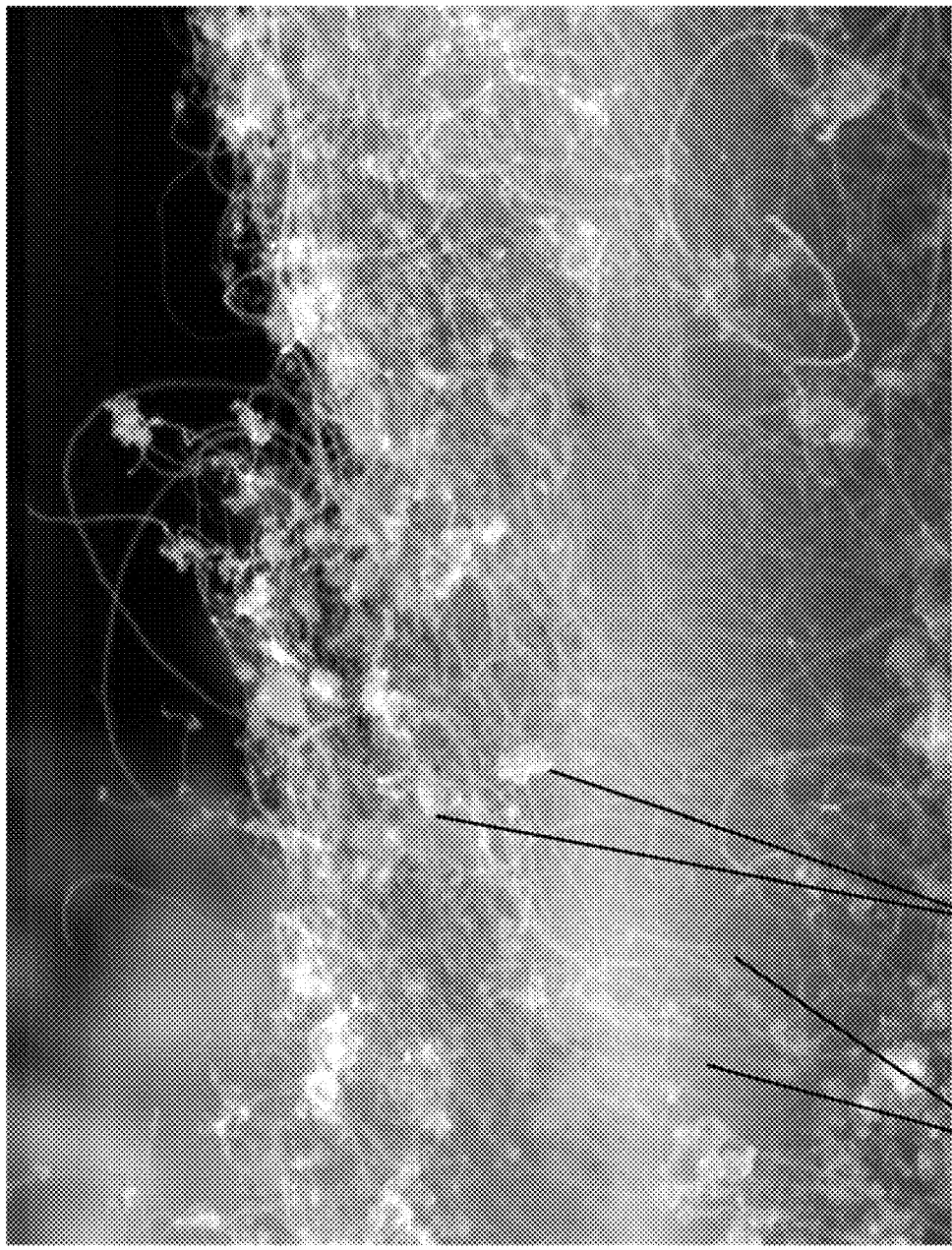
Figure 5:
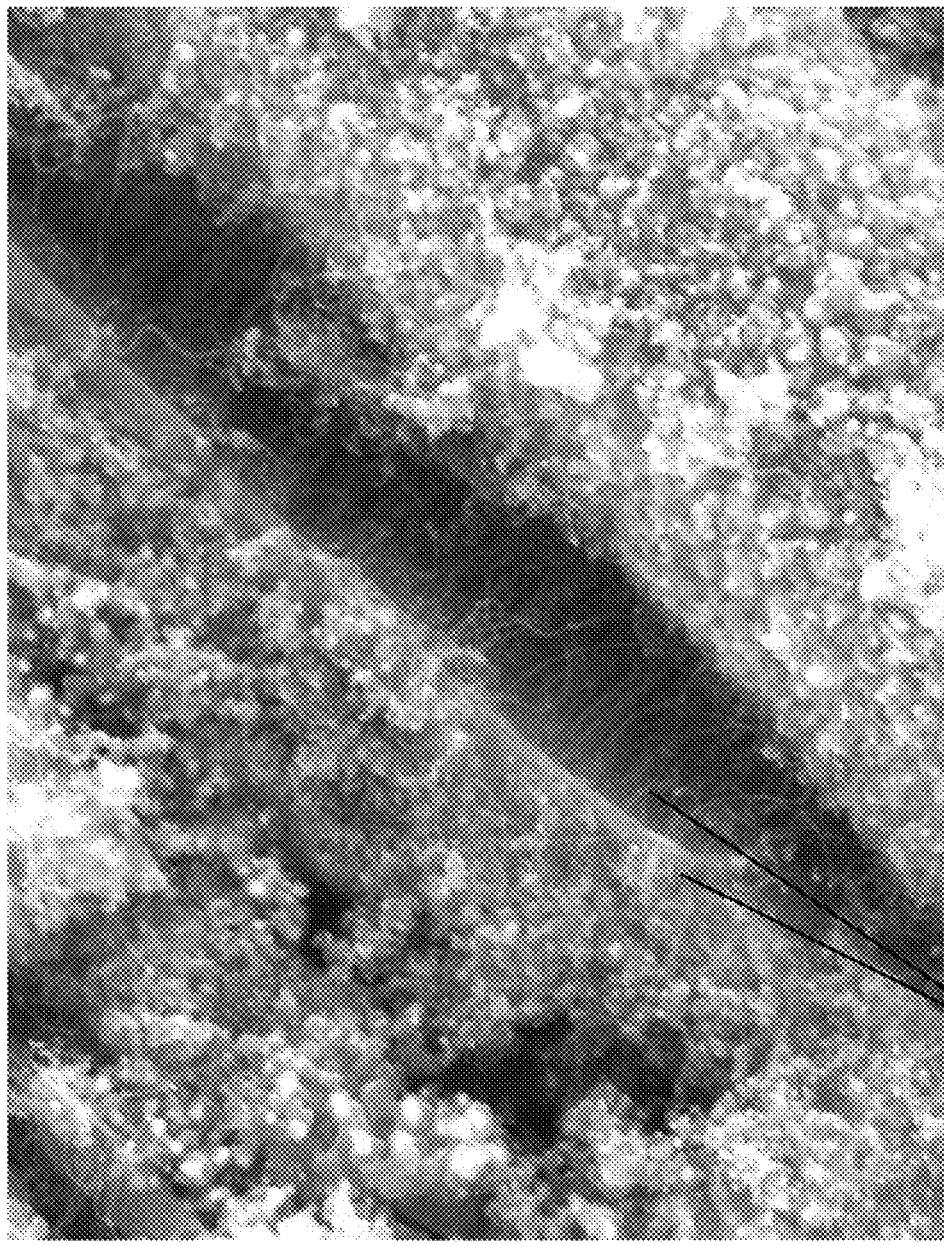

In the following detailed description of the preferred embodiments, reference is made to the accompanying drawings, which form a part hereof, and within which are shown by way of illustration the practice of specific embodiments of bulk nanotube structures and embodiments of methods for fabricating bulk nanotube structures. It is to be understood that other embodiments may be utilized, and that structural changes may be made and processes may vary in other embodiments.

Carbon nanotubes are typically grown on or at catalytic surfaces. Disclosed herein are carbon nanotubes grown on or at catalytic surfaces of metal catalyst species that are typically disposed adjacent the surfaces of fiber or particle substrates but that may also be disposed adjacent the surfaces of nanostructures (such as carbon nanotubes) that may be used as a substrate to produce carbon nanotubes. The combination of grown carbon nanotubes, the metal catalyst species and the fiber and/or particle and/or carbon nanotube substrate structures are referred to herein as "bulk nanotube structures."

The carbon nanotubes may be formed on metal salt catalytic species disposed adjacent fibers such as quartz fibers, which may be individual fibers of quartz wool. The quartz fibers typically have a diameter that is in a range from about 5 µm to about 10 µm. In other embodiments carbon fibers or activated carbon fibers may be used as substrates. Carbon fibers and activated carbon fibers that are used as substrates typically have a diameter that is in a range from about 5 µm to about 20 µm with 10 µm being typical. Some applications may employ combinations of two or more fibers selected from the quartz fiber, carbon fiber, and activated carbon fiber group of materials. The length of fibers used as substrates is generally not critical, and lengths may range from tens of μm to thousands of μm or longer.

Some embodiments may employ particles of quartz, carbon, or activated carbon as substrate materials. Such particles typically have a diameter that is in a range from about 1 nm to about 1 mm. Nanostructures (such as carbon nanotubes) may also be used as substrates and such materials typically have a diameter that is in a range from about 1 nm to about 70 nm with a range from about 5 nm to about 10 nm being typical.

Surface area and surface chemistry are important characteristics of substrate materials. The surface area of substrate materials is established in part by the external geometric characteristics of the material. For example if the substrate is a particle then the external surface approximates the surface area of a sphere that has the average diameter of the particle, and if the substrate is a fiber the external surface area approximates the surface area of a cylinder that has the length and the average diameter of the fiber. Generally the external surface area of substrate materials is relatively small, typically just a few sq. meters per gram. However, if the substrate is an "activated" (nanoporous) form of carbon, then internal geometric characteristics contribute greatly to the surface area of the substrate material. For example, pores in an activated carbon substrate material may result in surface areas upwards of several thousand sq. meters per gram. Surface chemistry treatments may be employed and may involve the formation of functional groups on the bulk media surface, including oxide species such as carboxyls, hydroxyls, carbonyls, lactones, etc. Certain physical/chemical structural characteristics of the substrate also affect the formation of carbon nanotubes. For example, carbon fibers may be based on an isotropic pitch precursor material, which results in comparatively little structural order in the carbon fiber produced, i.e., it is essentially "amorphous." Improvements in carbon nanotube production may be seen by using carbon structures having higher degrees of "order" such as graphite, which has a highly ordered structure. A relatively high degree of order (e.g., a graphitic structure) in the surface layers tends to be a better nucleation site for deposition of highly graphitic structures such as carbon nanotubes.

Polyacrylonitrile (PAN) and pitches, both mesophase (anisotropic) and isotropic, are the dominant precursors for commercial production of carbon fibers, although a few other precursors are also currently used, including rayon. PAN, mesophase pitch, and rayon may be preferred where production performance is important, but other precursors may be preferable if minimizing cost is important. If crystal structure ("order") in the carbon fiber substrate is important in a particular nanotube production process then carbon fibers produced from PAN and mesophase (anisotropic) pitch will likely be the preferred types of carbon fiber to use as a substrate.

The term "bulk support media" is used herein to refer to a particular group of substrate materials, namely to fibers having a diameter in a range from about 5 μm to about 20 μm, and particles having a diameter ranging from about 1 nm to about 1 mm, and to nanostructures having a diameter ranging from about 1 nm to about 70 nm. The term "carbon-based bulk support media" is used herein to refer to carbon fibers having a diameter in a range from about 5 μm to about 20 μm and carbon particles having a diameter ranging from about 1 nm to about 1 mm. As previously indicated, substrate materials have external surface areas and may have internal surface areas. The term "bulk support media surfaces" refers to surfaces forming both the external and internal surface areas of the fibers or particles or nanostructures. Some applications may employ, as a bulk support media, various combinations of two or more selections from the quartz fiber, quartz particle, carbon fiber, carbon particle, activated carbon fiber, activated carbon particle and nanostructure group of substrate materials.

Iron salts (such as iron chloride), aluminum salts (such as aluminum chloride) or nickel salts (such as nickel chloride) may be used separately or in any combination to form metal catalyst species to catalyze the growth of carbon nanotubes on bulk support media. The use of combinations of different metal salts may be beneficial in growing carbon nanotubes, particularly the use of a combination of an iron salt, an aluminum salt, and a nickel salt. Bulk support media having metal salts disposed adjacent the bulk support media surfaces is referred to herein as salted bulk support media.

Metal salts (e.g., the nickel, iron and aluminum salt catalytic species) are typically formed on bulk support media surfaces (e.g., the surfaces of quartz fibers) by exposing the bulk support media to an aqueous metal salt solution of about 1 M concentration. Solutions ranging in concentration from about 0.001 M to about 1 M may also be used with about 0.1 to about 1 M being preferred. For example, bulk support media fibers or particles may be immersed in a salt solution at room temperature for an immersion time that is in a range from about ten seconds to about a minute, with about thirty seconds being typical. The bulk material thus wetted with the salt solution is then dried to produce the salted bulk support media. Drying may be accomplished by simply exposing the wetted bulk support material to atmospheric air for a time period sufficiently long to dry the media. Alternately or in combination with air drying, as will be subsequently discussed, the bulk support media is heated as part of the process to form carbon nanotubes, and that heating step may also serve to dry the wetted bulk support media.

FIG. 1 presents a somewhat schematic representation of an apparatus 50 to produce bulk nanotube structures. Salted bulk support media 14 is disposed in a process vessel 52 that is disposed in process oven 54. The process vessel 52 may be a quartz boat or a similar vessel fabricated from a material that does not react with the chemicals used in the process. The chemical-impregnated (salted) bulk support media 14 is heated in the oven 54 to a carbon nanotube growing temperature that is in a range from about 500° C. to about 700° C., with about 600° C. being typical. In some embodiments a protective atmosphere is provided to prevent, or at least minimize, oxidizing or other reactions during heating. A protective atmosphere may be provided by using an evacuation pump 56 to evacuate the oven 54 to a pressure low enough to inhibit oxidation, or by flooding the oven 54 with argon from an argon source 58 through valve 60. Heating the salted bulk support media 14 is a process that may take one to two hours, consequently any surfaces of the salted bulk support media 14 that remained wet from exposure to the aqueous metal salt solution are dried by that heating process.

At some point during heating, if argon from the argon source 58 has been used to provide a protective atmosphere, valve 60 is closed and a reducing atmosphere, typically comprising about 4% hydrogen and 96% argon, is introduced into the process vessel 52 at a rate of about 100 cc per minute from a hydrogen/argon source 62 through valve 64. The hydrogen reduces the metal salts to elemental metals (or other catalytic compositions) that are referred to herein as metal catalyst species. A combination of bulk support media and adjacent metal catalyst species is referred to herein as catalyzed bulk support media.

When the catalyzed bulk support media reaches the carbon nanotube growing temperature, the apparatus 50 is typically configured to provide a pressure of about 5 Torr to 100 Torr in the oven 54. However, higher pressures up to atmospheric pressure may be used. When these operating temperature and pressure conditions have been reached, the catalyzed bulk support media is exposed to an organic vapor (typically ethanol) to grow carbon nanotubes and complete the formation of the bulk nanotube structures. The flow of about 4% hydrogen and about 96% argon from the hydrogen/argon source 62 is also maintained through the valve 64. The hydrogen acts as a getter for binding oxygen that may evolve during the remainder of the process. The hydrogen also helps prevent oxidation of the elemental metals derived from the metal salts. After the bulk nanotube structures are removed from the reducing environment and exposed to air, some or all of the metal catalyst species (which had been reduced by the hydrogen) will likely oxidize. Such oxidized species are included in the scope of the term "metal catalyst species" as used herein.

In the embodiment of FIG. 1, after the catalyzed bulk support media is formed, it is exposed (at a carbon nanotube growing temperature) to organic vapor (in this case, ethanol) by opening a valve 66 to a liquid ethanol source 68 while continuing to flow the hydrogen/argon reducing atmosphere from hydrogen/argon source 62 through valve 64. A pressure differential between the pressure of the liquid ethanol source 68 and the pressure in the oven 54 causes the ethanol to evaporate and flow into the oven 54 at a rate that typically is within a range from about 10 cc per minute to about 575 cc per minute. The proportions of hydrogen, argon and ethanol are generally not critical, and may be values that range from about 0.003% to about 4% hydrogen, from about 14% to about 88% argon and from about 10% to about 85% ethanol. The catalyzed bulk support media is exposed to this atmosphere for an exposure time that ranges from about one hour to about eight hours, with about thirty minutes to one hour being typical. During this exposure carbon nanotubes grow adjacent the metal catalyst species.

If penetration of the bulk support media by the organic vapor is restricted (such as may occur with compacted or agglomerated particles), a process vessel formed as a flat pan may be used in the oven 54 to expose more of the catalyzed bulk support media to the organic vapor than would be exposed if the catalyzed bulk support media were disposed in a deeper vessel. A stirring mechanism or a fluidized bed system may also be used to improve exposure of the catalyzed bulk support media.

FIGS. 2-5 present photomicrographs of carbon nanotubes 100 grown using a process disclosed herein. The carbon nanotubes 100 are predominantly multi-walled carbon nanotubes, although single-walled carbon nanotubes may be produced. FIGS. 2-5 illustrate carbon nanotubes 100 adjacent metal catalyst species 102 that are disposed adjacent bulk support material 104. The bulk support material 104 is quartz wool and the carbon nanotubes 100 are grown adjacent metal catalyst species 102 comprising iron (from iron chloride), aluminum (from aluminum chloride), and nickel (from nickel chloride).

The bulk nanotube structures disclosed herein have several potential advantages over other nanostructured materials. For example, fiber structures having adjacent carbon nanotubes may provide increased adhesive bonding strength in composite structures. Carbon fiber structures having adjacent carbon nanotubes may provide better electrical conductivity in carbon-carbon composites, which may enhance the ability of such structures to dissipate static electricity buildup, and may enhance the ability of carbon-carbon composite aircraft structures to withstand lightening strikes, and may provide a more suitable substrate for electronic components and systems. Fiber or particle structures having adjacent carbon nanotubes provide increased surface area which improves the liquid and gas sorption capacity of such structures. Another potential advantage is in metallurgy. Quartz has a substantial silicon component, and silicon is used as an alloying material in some steels and other alloys such as aluminum. Carbon nanotubes may enhance structural properties of such alloys, but carbon nanotubes are not easily wetted by molten metal and hence carbon nanotubes are difficult to integrate into metal alloys. The substitution of quartz fibers (or particles) having adjacent carbon nanotubes for the traditional silicon alloying material in a metal melt may provide an improved approach for introducing carbon nanotubes into the alloy.

After the production of the bulk nanotube structures, which at that point typically include elemental metal (and may include metal oxides if the bulk nanotube structures have been exposed to air), the metal catalyst species may be dissolved with an acid such as hydrochloric or nitric acid. Furthermore, if a carbon-based bulk support material has been used as the bulk support media, a blend of concentrated mineral acids, including $HCl$, $H_2SO_4$, $HNO_3$, and $HClO_4$, may be used to remove the carbon fibers and/or carbon particles, which are oxidized to $CO_2$. Whatever other materials are present in the bulk nanotube structures (e.g., metal catalyst species: metals, oxides, salts, etc.) are solubilized. The oxidation/dissolution process may be enhanced with application of microwave energy. The $CO_2$ and the solubilized metal catalyst species are a "fluid extract," and the residual generally-pure carbon nanotubes may be separated from the fluid extract by filtration, centrifugation, or a similar process.

In summary, embodiments disclosed herein provide methods and equipment for fabricating bulk nanotube structures. The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A bulk nanotube structure comprising:
   a bulk support media;
   a metal catalyst species comprising aluminum disposed adjacent the bulk support media; and
   a plurality of carbon nanotubes disposed adjacent the metal catalyst species.

2. The bulk nanotube structure of claim 1 wherein the bulk support media comprises quartz fibers.

3. The bulk nanotube structure of claim 1 wherein the bulk support media comprises carbon fibers.

4. The bulk nanotube structure of claim 1 wherein the bulk support media comprises activated carbon fibers.

5. The bulk nanotube structure of claim 1 wherein the bulk support media comprises quartz particles.

6. The bulk nanotube structure of claim 1 wherein the bulk support media comprises carbon particles.

7. The bulk nanotube structure of claim 1 wherein the bulk support media comprises activated carbon particles.

8. The bulk nanotube structure of claim 1 wherein the bulk support media comprises carbon nanotubes.

9. The bulk nanotube structure of claim 1 wherein the metal catalyst species comprises iron.

10. The bulk nanotube structure of claim 1 wherein the metal catalyst species comprises nickel.

11. The bulk nanotube structure of claim 1 wherein the metal catalyst species comprises iron and aluminum and nickel.

12. A method of fabricating a bulk nanotube structure comprising:
    wetting a bulk support media with a metal salt solution comprising an aluminum salt;
    drying the wetted bulk support media to form metal salts adjacent the bulk support media;
    heating the bulk support media and the metal salts in a reducing atmosphere having a pressure in a range from about 5 Torr to about atmospheric pressure to a temperature in a range from about 500° C. to about 700° C. to form metal catalyst species adjacent the bulk support media; and
    exposing the heated bulk support media and the metal catalyst species to a gaseous mixture comprising an organic vapor and hydrogen, wherein carbon nanotubes are formed adjacent the metal catalyst species.

13. The method of claim 12 wherein the bulk support media comprises quartz fibers.

14. The method of claim 12 wherein the bulk support media comprises carbon fibers.

15. The method of claim 12 wherein the bulk support media comprises activated carbon fibers.

16. The method of claim 12 wherein the bulk support media comprises quartz particles.

17. The method of claim 12 wherein the bulk support media comprises carbon particles.

18. The method of claim 12 wherein the bulk support media comprises activated carbon particles.

19. The method of claim 12 wherein the bulk support media comprises carbon nanotubes.

20. The method of claim 12 wherein the metal salt solution comprises an iron salt.

21. The method of claim 12 wherein the metal salt solution comprises a nickel salt.

22. The method of claim 12 wherein the metal salt solution comprises an iron salt and an aluminum salt and a nickel salt.

23. The method of claim 12 wherein the organic vapor comprises ethanol.

* * * * *